(12) United States Patent
Takagi et al.

(10) Patent No.: US 6,342,829 B1
(45) Date of Patent: Jan. 29, 2002

(54) ACCELERATOR OPENING DEGREE SENSOR

(75) Inventors: Yasuo Takagi, Tochigi-ken; Shunichi Tsuzuki, Utsunomiya; Tsutomu Kobayashi, Saitama-ken; Yoshihiro Miyamoto, Tochigi-ken, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/514,005

(22) Filed: Feb. 25, 2000

(30) Foreign Application Priority Data

Jun. 24, 1999 (JP) .......................... 11-178960

(51) Int. Cl.[7] .............................................. H01C 10/00
(52) U.S. Cl. .................. 338/153; 338/162; 338/89; 338/90; 338/139; 338/92
(58) Field of Search ................... 338/89, 90, 91, 338/121, 122, 153, 162, 185, 190, 194, 139, 92, 95

(56) References Cited

U.S. PATENT DOCUMENTS

| | | | | |
|---|---|---|---|---|
| 686,246 A | * | 11/1901 | Bachmann et al. | 338/139 |
| 2,134,870 A | * | 11/1938 | Fruth | 338/142 |
| 2,711,463 A | * | 6/1955 | Goeppinger et al. | 338/120 |
| 3,324,440 A | * | 6/1967 | Strief et al. | 338/162 |
| 3,492,623 A | * | 1/1970 | Yamada | 338/162 |
| 4,032,881 A | * | 6/1977 | Singleton | 338/195 |
| 4,139,831 A | * | 2/1979 | Ortlieb et al. | 338/128 |
| 4,196,410 A | * | 4/1980 | Kasajima et al. | 338/185 |
| 4,915,075 A | * | 4/1990 | Brown | 338/153 |
| 5,063,811 A | * | 11/1991 | Smith et al. | 338/153 |
| 5,133,321 A | * | 7/1992 | Hering et al. | 338/153 |

FOREIGN PATENT DOCUMENTS

| | | |
|---|---|---|
| JP | 57195823 | 12/1982 |
| JP | B2-6334307 | 7/1988 |
| JP | 63186102 | 8/1988 |
| JP | 63247610 | 10/1988 |
| JP | 01253601 | 10/1989 |

\* cited by examiner

Primary Examiner—Karl D. Easthom

(57) ABSTRACT

A sensor comprises a linear region (variable region) in which the output voltage is changed in proportion to the accelerator opening degree, and a stepped region (invariable region) in which the output voltage is not changed with respect to the accelerator opening degree. A resistor electrode for constructing the sensor is formed by laminating a resistor composed of a resistance substance on a base plate in a linear section corresponding to the linear region. In a stepped section corresponding to the stepped region, the resistor electrode is formed by laminating the resistor on a conductive layer composed of a conductive substance formed on the base plate.

7 Claims, 13 Drawing Sheets

F I G. 2
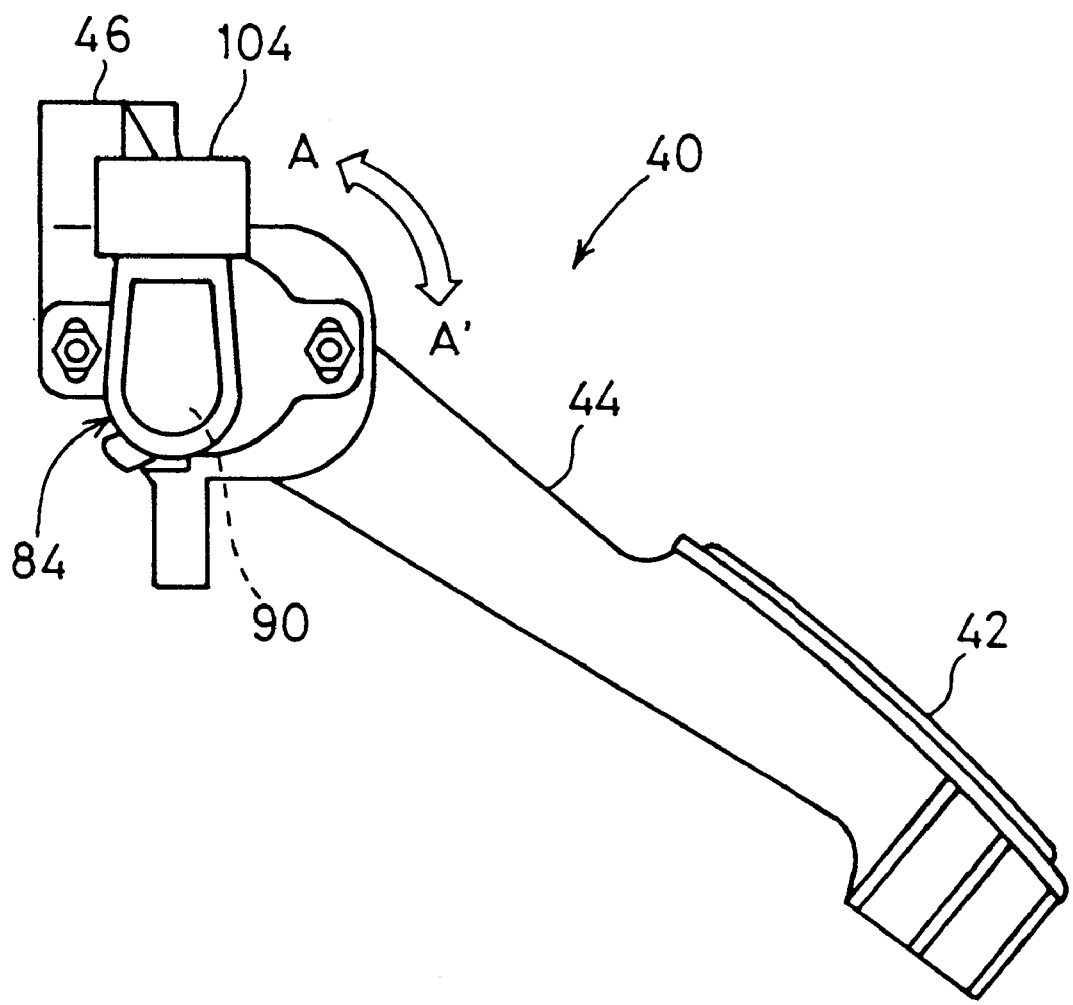

ACCELERATOR OPENING DEGREE SENSOR

BACKGROUND OF THE INVENTION

1. Field of the Invention

The present invention relates to an accelerator opening degree sensor which constitutes an electronic control throttle system carried on an automobile or the like, for detecting a pedaling amount of an accelerator pedal.

2. Description of the Related Art

The electronic control throttle system, which is carried on an automobile or the like, is hitherto provided with a sensor for detecting the amount of pedaling of an accelerator pedal (pedaling amount) by a driver. The sensor is constructed such that an output voltage corresponding to the pedaling amount is obtained. The sensor is connected to the accelerator pedal via a wire or a link (see, for example, Japanese Patent Publication No. 63-34307).

In the case of the accelerator pedal described above, the sensor and the accelerator pedal are constructed separately. The sensor and the accelerator pedal are connected with each other via the wire or the link. For this reason, it has been difficult to realize a light weight and a low price of the sensor and the accelerator pedal.

In the case of the accelerator pedal described above, a little dispersion sometimes arises in the stroke range of the accelerator pedal. As a result, for example, when the accelerator pedal is maximally pedaled, the output voltage from the sensor exceeds a predetermined limit value (disorder judgement value) in some cases. In such a case, there is a possibility to make erroneous detection that any disorder occurs in the sensor.

In order to avoid the problem as described above, a method is conceived to decrease the dispersion of the stroke range of the accelerator pedal. However, for this purpose, it is necessary to use a stopper which has high positional accuracy and which is capable of enduring the pedaling force exerted on the accelerator pedal by the driver. Therefore, it is feared that the cost is greatly increased.

Another method is also conceived, in which any stopper is provided for the sensor. However, in the case of such an accelerator pedal in which the sensor and the accelerator pedal are connected via the wire as described above, the structure becomes more complicated. In such an arrangement, it becomes more difficult to realize a light weight and a low price of the sensor and the accelerator pedal.

Still another method is also conceived, in which the ratio of change (slope) of the output voltage is decreased with respect to the pedaling amount of the accelerator pedal. However, in this case, it is feared that sufficient output voltage is not obtained within the stroke range.

SUMMARY OF THE INVENTION

The present invention has been made in order to overcome the inconvenience as described above, an object of which is to provide an accelerator opening degree sensor which makes it possible to realize a light weight and a low price and which makes it possible to obtain a sufficient and effective output voltage within a stroke range of an accelerator pedal.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 shows a side view illustrating an accelerator unit attached with the accelerator opening degree sensor according to the first embodiment;

DESCRIPTION OF THE PREFERRED EMBODIMENTS

The accelerator opening degree sensor according to the present invention is exemplified by preferred embodiments, which will be explained in detail below with reference to the accompanying drawings.

Figure 1:
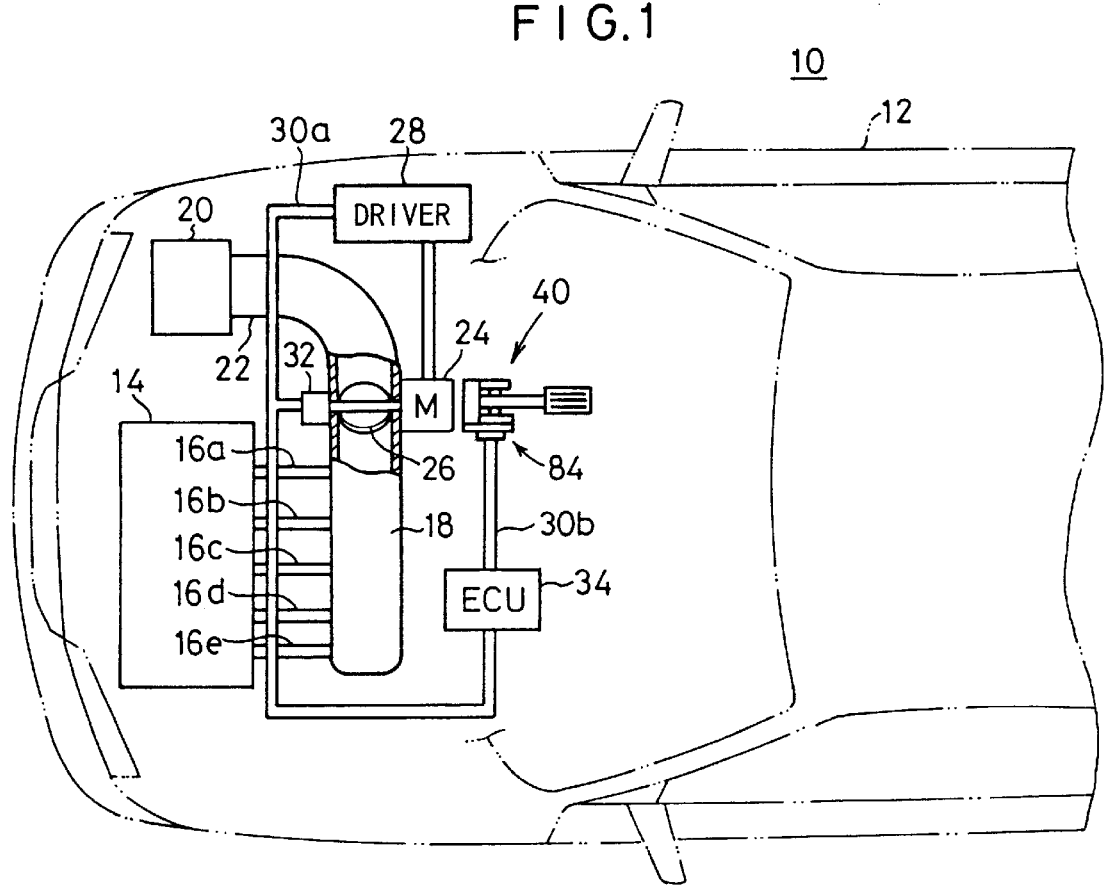
FIG. 1 shows an illustrative plan block diagram depicting major components of an automobile to which an accelerator opening degree sensor according to the first embodiment of the present invention is applied.

FIG. 1 shows an automobile 10 to which an accelerator opening degree sensor according to the first embodiment of the present invention is applied.

An engine 14 is carried on a body 12 of the automobile 10. The engine 14 is connected with an intake manifold 18 which has a plurality of branched tubes 16a to 16e. An air-fuel mixture mixed with air and fuel is supplied to the engine 14 via the intake manifold 18. In this arrangement, the fuel is supplied from a carburetor or an injector which is not shown.

The air is supplied to the intake manifold 18 via an air cleaner 20 and an intake tube 22. In this arrangement, a throttle valve 26, to which a motor 24 is connected, is provided on the inlet side of the intake manifold 18. The flow rate of air to be supplied to the intake manifold 18 is regulated by regulating the opening degree of the throttle valve 26 by driving the motor 24.

A driver 28 is electrically connected to the motor 24. In this arrangement, the motor 24 is driven by a motor current I supplied from the driver 28.

A signal line 30a is connected to the driver 28. A throttle sensor 32 for detecting the opening degree of the throttle valve 26 and ECU (Electric Control Unit) 34 are connected to the signal line 30a. In this arrangement, the driver 28 controls the motor 24 on the basis of a throttle opening degree θa supplied from the throttle sensor 32 and a target opening degree θ0 supplied from ECU 34.

ECU 34 comprises a microcomputer containing CPU (Central Processing Unit), ROM (Read Only Memory) for storing, for example, a system program and an application program, RAM (Random Access Memory) to be used, for example, operation work, a timer for measuring the time, and input/output interfaces such as an A/D (Analog to Digital) converter and a D/A (Digital to Analog) converter, etc.

An accelerator unit 40 is fixed to the body 12 of the automobile 10. As shown in FIG. 2, the accelerator unit 40 comprises a pedal lever (lever) 44 which is formed integrally with an accelerator pedal 42, and a bracket 46 for rotatably supporting the pedal lever 44.

Figure 3:
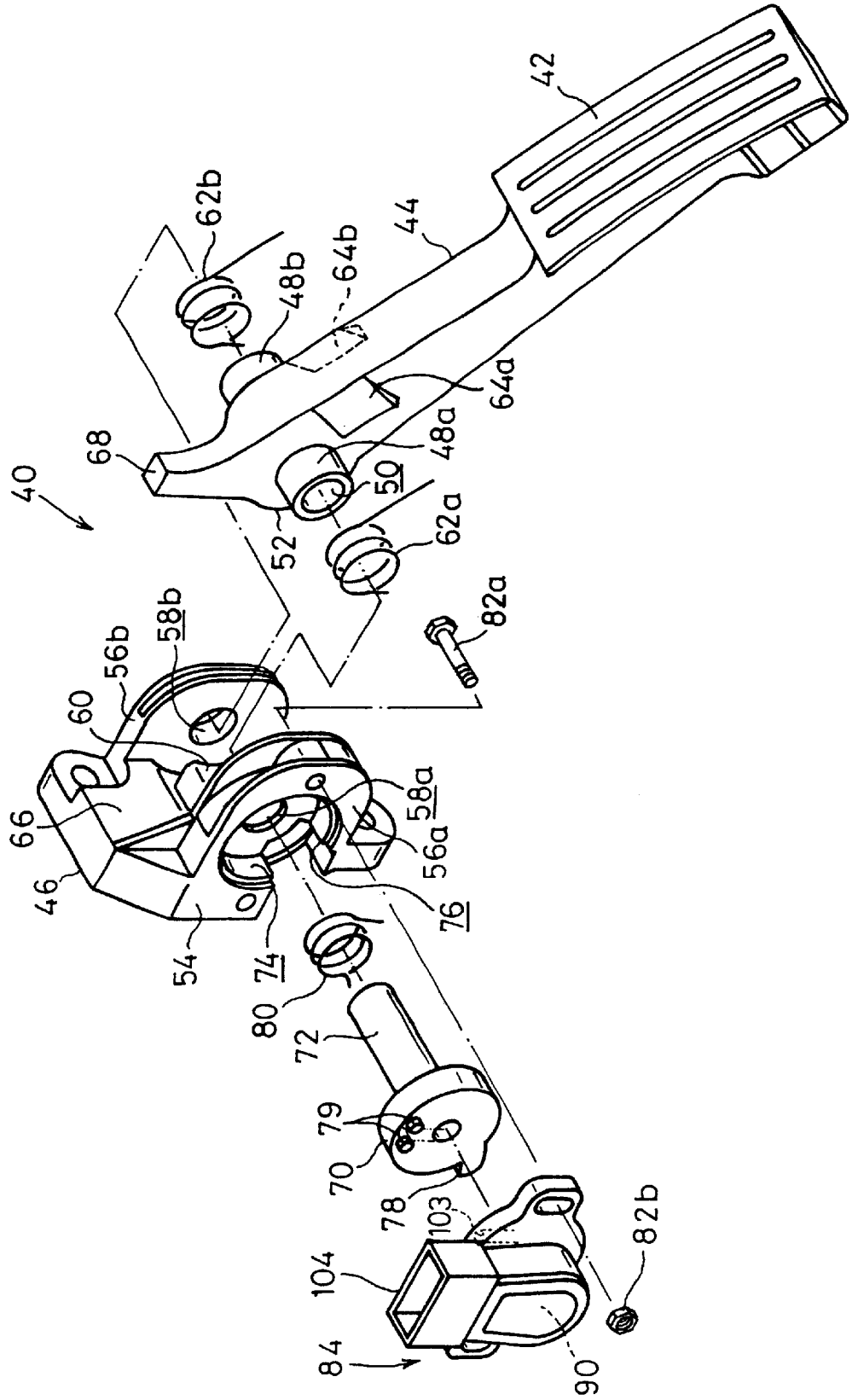
FIG. 3 shows an exploded perspective view illustrating the accelerator unit shown in FIG. 2.

As shown in FIG. 3, the accelerator pedal 42 is formed at an upper surface portion on the first end side of the pedal lever 44. Shafts (support shafts) 48a, 48b are formed to protrude on the both side surfaces on the second end of the pedal lever 44. A hole 50 is formed to penetrate through substantially central portions of the shafts 48a, 48b. A curved section 52, which is formed coaxially with the shafts 48a, 48b to have a circular circumferential configuration, is provided at a lower surface portion on the second end side of the pedal lever 44.

On the other hand, the bracket 46 is provided with a base plate 54, and a pair of bearing sections 56a, 56b which are formed integrally to protrude from the base plate 54. Holes 58a, 58b are formed coaxially at the bearing sections 56a, 56b respectively. The pedal lever 44 is rotatably supported by the bracket 46 in a state in which the shafts 48a, 48b of the pedal lever 44 are inserted into the holes 58a, 58b.

A curved section 60 is provided at a front portion of the base plate 54, the portion making sliding movement with the curved section 52 of the pedal lever 44. The curved section 60 of the bracket 46 is formed to have a circular circumferential configuration corresponding to the shape of the curved section 52 of the pedal lever 44.

Return springs 62a, 62b are installed to the shafts 48a, 48b of the pedal lever 44 respectively. First ends of the return springs 62a, 62b abut against the base plate 54 of the bracket 46 respectively. Second ends of the return springs 62a, 62b abut against projections 64a, 64b which are provided in the vicinity of the shafts 48a, 48b of the pedal lever 44 respectively. Accordingly, the return springs 62a, 62b are installed to the shafts 48a, 48b in a state of being restricted for their rotation.

The pedal lever 44 is urged in the direction of the arrow A as shown in FIG. 2 (direction for the accelerator pedal 42 to make displacement in the upward direction) by the aid of the repulsive force of the return springs 62a, 62b.

As shown in FIG. 3, a tapered surface 66, which is formed to have an inclined configuration, is formed at an upper portion of the front surface of the base plate 54 of the bracket 46. A projection 68 is formed at the second end of the pedal lever 44. The projection 68 abuts against the tapered surface 66, and thus the range of rotation of the pedal lever 44 is restricted in the direction of the arrow A.

The position, at which the projection 68 abuts against the tapered surface 66, is the start point of the stroke range of the pedal lever 44 (pedaling start position of the accelerator pedal 42), which will be specifically explained below. When the pedal 42 is pedaled by a driver for the automobile 10, it is rotated in the direction of the arrow A' (direction opposite to the direction of the arrow A) in FIG. 2. When the pedaling force exerted by the driver is released, the pedal lever 44 is rotated in the direction of the arrow A in FIG. 2 in accordance with the repulsive force of the return springs 62a, 62b. When the projection 68 abuts against the tapered surface 66, the pedal lever 44 is stopped at this position (stopper position).

As shown in FIG. 3, a shaft 72 (rotary shaft), which is connected to a coupling member 70, is inserted into the hole 50 of the pedal lever 44. The shaft 72 is rotated integrally with the pedal lever 44 in accordance with the rotation of the pedal lever 44. A recess 74, which corresponds to the shape of the coupling member 70, is formed on the first bearing section 56a. The coupling member 70 is rotatably accommodated in the recess 74.

The recess 74 is provided with a cutout 76 which is formed by cutting out a part of the wall for forming the recess 74. A projection 78 is provided on the outer circumference of the coupling member 70. The projection 78 abuts against the both ends of the cutout 76, and thus the range of rotation of the coupling member 70 is restricted.

A return spring 80 is installed to the shaft 72. The first end of the return spring 80 abuts against the first end of the cutout 76, and the second end of the return spring 80 abuts against the projection 78 of the coupling member 70. Accordingly, the return spring 80 is restricted for its rotation with respect to the shaft 72. The return spring 80 urges the coupling member 70 in the direction of the arrow A in FIG. 2.

A sensor unit 84 is attached to the bracket 46 by the aid of screws 82a and nuts 82b (see FIG. 3).

Figure 4:
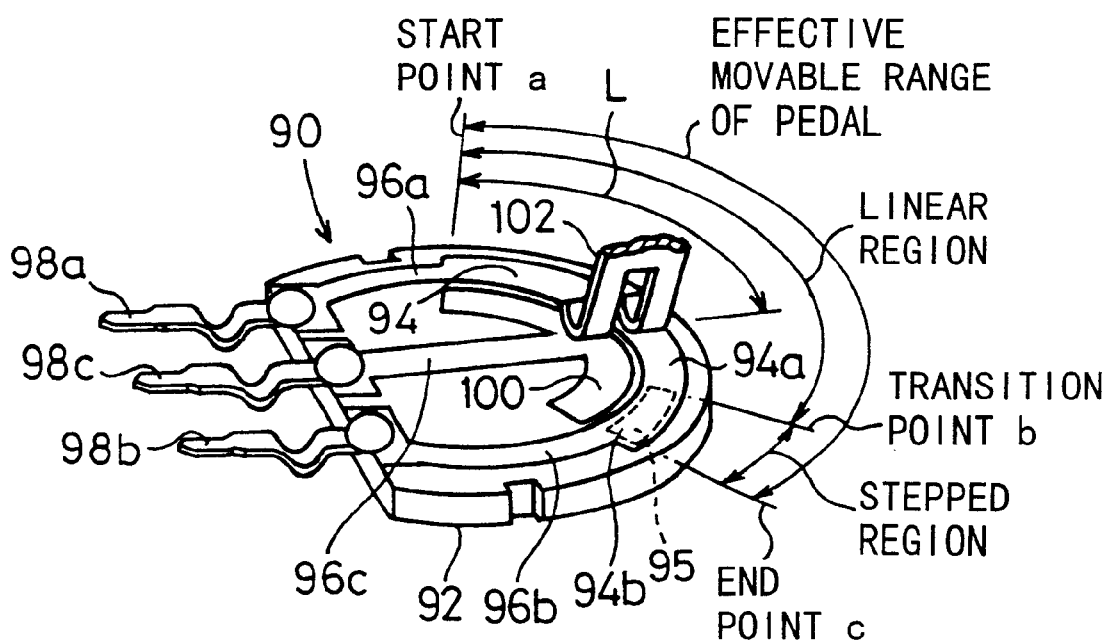
FIG. 4 shows a perspective view illustrating the accelerator opening degree sensor according to the first embodiment.

As shown in FIG. 4, the sensor unit 84 includes therein a sensor (accelerator opening degree sensor according to the first embodiment) 90 which is composed of a potentiometer. In this arrangement, the sensor 90 (potentiometer) is the pedaling amount/voltage conversion means. As described later on, the sensor 90 comprises a resistor which is arranged between fixed side terminals so that a sliding element, which slides on the resistor, is connected to a movable side terminal.

The sensor 90 includes a planar base plate 92 having a substantially semicircular configuration, and a resistor electrode 94 composed of the resistance substance (resistor) 93 formed on the base plate 92. The resistor electrode 94 is formed to have a substantially planar circular arc-shaped configuration along the outer circumferential surface of the base plate 92.

The both ends of the resistor electrode 94 are connected to the terminals (fixed side terminals) 98a, 98b via connecting electrodes 96a, 96b respectively. In this arrangement, the terminal 98a is disposed on the ground side.

An output electrode 100 is formed along the resistor electrode 94 on the base plate 92. The output electrode 100 is connected to the terminal (movable side terminal) 98c via a connecting electrode 96c. Each of the connecting electrodes 96a, 96b, 96c and the output electrode 100 is formed of a conductive substance (conductor).

The sensor 90 has a brush (sliding element) 102 which makes sliding movement on the resistor electrode 94 and the output electrode 100. The brush 102 forms a short circuit between the resistor electrode 94 and the output electrode 100.

As shown in FIG. 3, the brush 102 is connected via a connecting member (rod) 103 to projections 79 provided on the coupling member 70. The brush 102 is displaced in accordance with the rotation of the coupling member 70.

An output voltage V, which depends on the accelerator opening degree $\theta$ (i.e., the movement distance L of the brush 102 from the start point "a") corresponding to the angle of rotation of the coupling member 70 (i.e., the pedaling amount of the accelerator pedal 42), is obtained from the terminal 98c (see FIGS. 3 and 4).

The effective movable range of the brush 102, i.e., the effective movable range of the accelerator pedal 42 (pedal effective movable range) is a range in FIG. 4 from the start point "a" (point corresponding to the pedaling start position of the accelerator pedal 42 at which the accelerator opening degree $\theta$ satisfies $\theta=0$) to the end point "c" (point corresponding to the pedaling end position of the accelerator pedal 42 at which the accelerator opening degree $\theta$ satisfies $\theta=\theta 2$).

The terminals 98a to 98c are connected to unillustrated terminals in the socket 104 via unillustrated lead wires (see FIG. 3). As shown in FIG. 1, the outputs from the terminals 98a to 98c are supplied to ECU 34 via a signal line 30b connected to the socket 104 by the aid of an unillustrated adapter.

Figure 5:
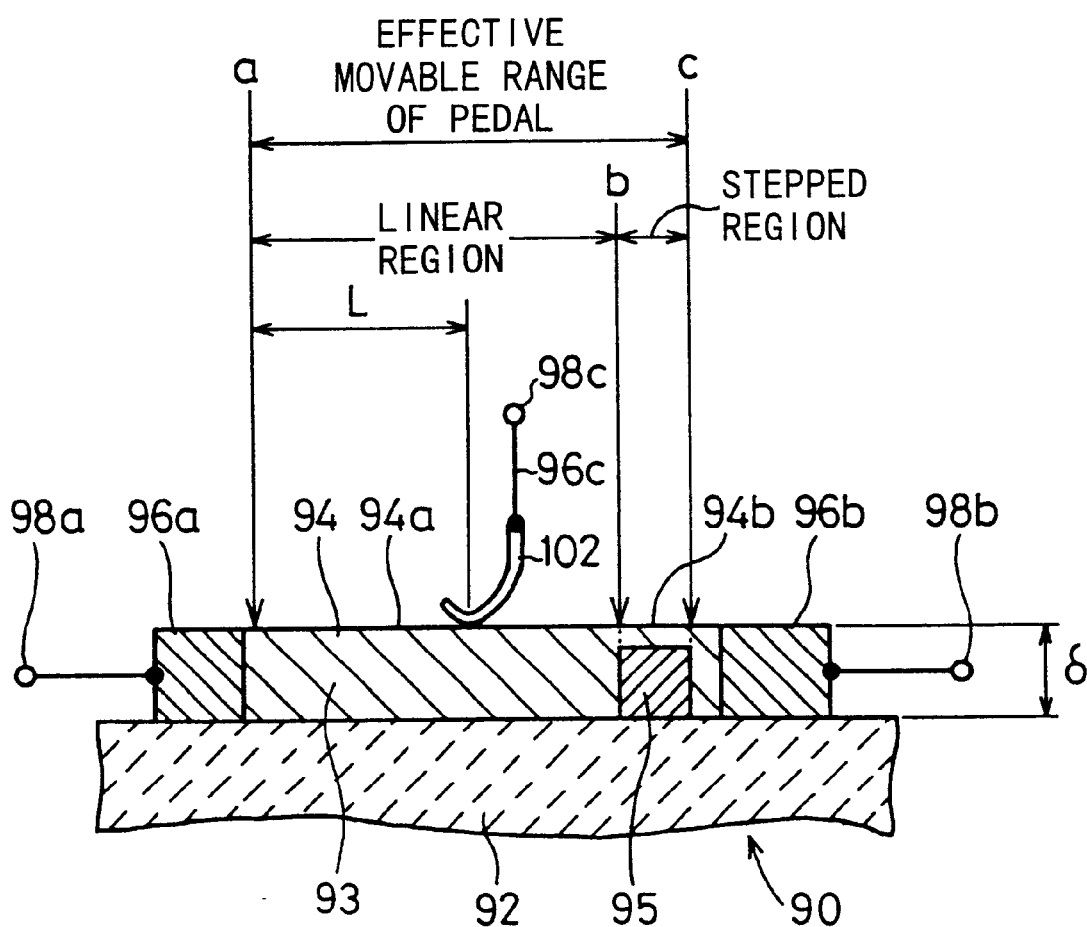
FIG. 5 shows, with partial omission, a sectional view illustrating the accelerator opening degree sensor shown in FIG. 4.

As shown in FIG. 5, the resistor electrode 94 is provided with a linear section 94a which corresponds to a first conversion region (linear region) ranging from the start point "a" to the transition point "b" (point corresponding to the position in the vicinity of the pedaling end of the accelerator pedal 42 at which the accelerator opening degree $\theta$ satisfies $\theta=\theta 1$). In the linear section 94a, the resistor electrode 94 is formed by laminating one or multiple layers of the resistor 93 composed of the resistance substance on the base plate 92.

The resistor electrode 94 is provided with a stepped section 94b which corresponds to a second conversion region (stepped region) ranging from the transition point "b" to the end point "c". In the stepped section 94b, the resistor electrode 94 is formed by laminating one or multiple layers of the resistor 93 on a conductive layer 95 composed of a conductive substance (conductor) formed on the base plate 92.

In this arrangement, the thickness $\delta$ of the resistor electrode 94 including the conductive layer 95 is constant in the effective movable range of the pedal. In other words, the resistor electrode 94 in the stepped section 94b is formed to be thin-walled as compared with the linear section 94a.

Figure 6:
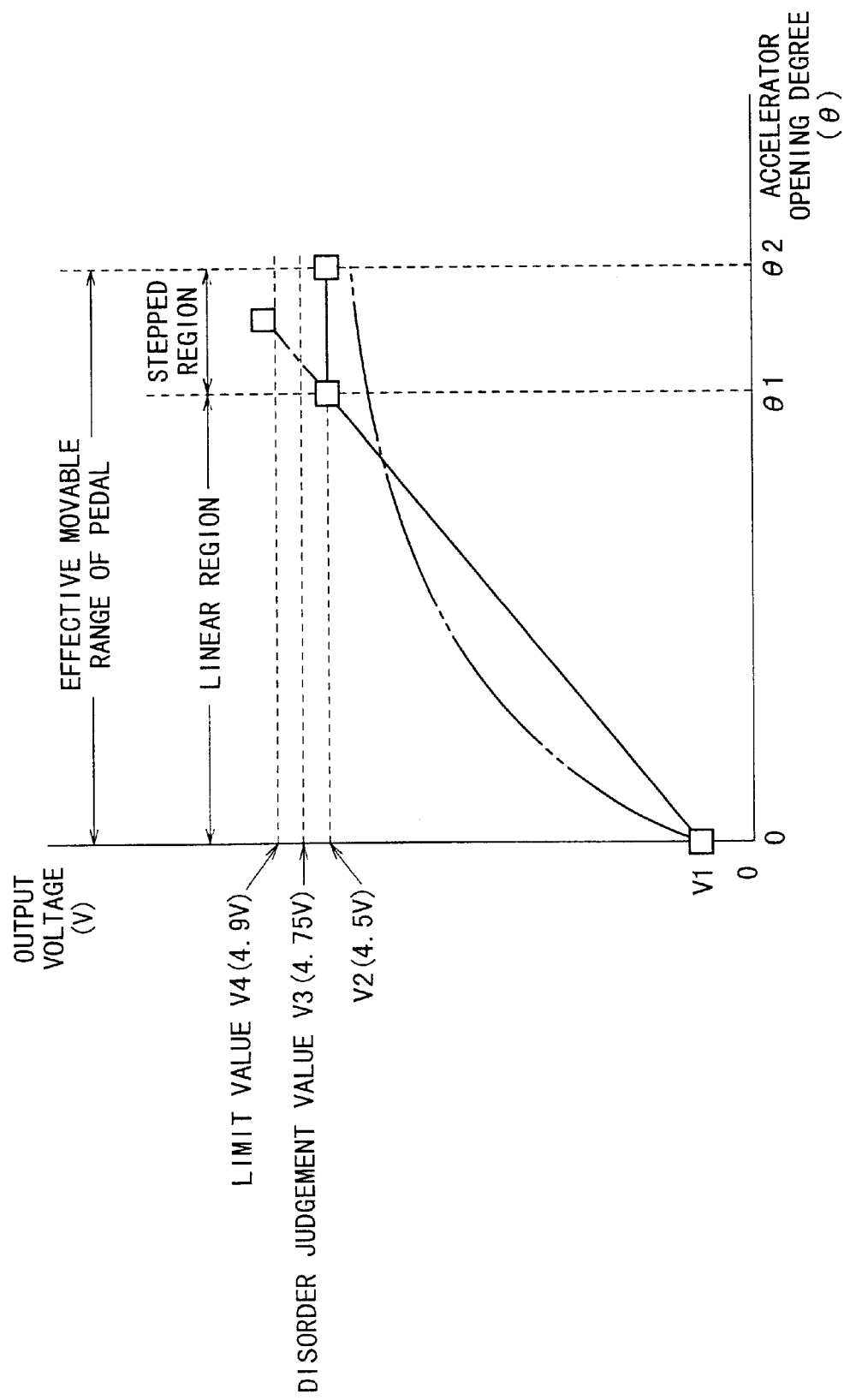
FIG. 6 shows a graph illustrating a characteristic of the output voltage with respect to the accelerator opening degree concerning the accelerator opening degree sensor shown in FIG. 5.

FIG. 6 shows a characteristic of the output voltage V outputted from the sensor 90 on the basis of the accelerator opening degree $\theta$.

As shown by a solid line in FIG. 6, the output voltage V in the linear region is increased linearly (proportionally) from V=V1 to V=V2 in accordance with the increase In the accelerator opening degree $\theta$ from $\theta=0$ to $\theta=\theta 1$. That is, the linear region is a variable region in which the output voltage V is changed depending on the accelerator opening degree $\theta$.

On the other hand, the output voltage V in the stepped region has a constant value of V=V2 with respect to the change of the accelerator opening degree $\theta$. That is, the stepped region is an invariable region in which the output voltage V is not changed.

When the invariable region is provided as described above, then the output voltage V does not exceed a predetermined disorder judgement value (V3), and it does not exceed a predetermined limit value (V4) as shown by a dashed line in FIG. 6. Therefore, there is no possibility of any erroneous judgement that any disorder occurs in the sensor 90. Further, it is possible to obtain a sufficient output voltage V within the effective movable range of the pedal.

For example, when V2 shown in FIG. 6 satisfies V2=4.5 V, then V3 (disorder judgement value) satisfies, for example, V3=4.75 V, and V4 (limit value) satisfies, for example, V4=4.9 V.

Alternatively, as shown by a two-dot chain line in FIG. 6, the sensor 90 may be constructed such that the output voltage V is changed along with a quadric curve with respect to the accelerator opening degree $\theta$. In this arrangement, the ratio of change of the output voltage V with respect to the accelerator opening degree $\theta$ is decreased in accordance with the increase in the accelerator opening degree $\theta$.

In order to change the ratio of change of the output voltage V with respect to the accelerator opening degree $\theta$ as described above, those usable include, for example, a method in which the composition of the resistance substance (for example, the content of carbon) for constructing the resistor electrode 94 is changed, and/or a method in which the cross-sectional area of the resistor electrode 94 is changed. The stepped section 94b can be also formed in accordance with these methods.

Next, explanation will be made for the operation of the automobile 10 to which the accelerator opening degree sensor according to the first embodiment of the present invention is applied.

Figure 7:
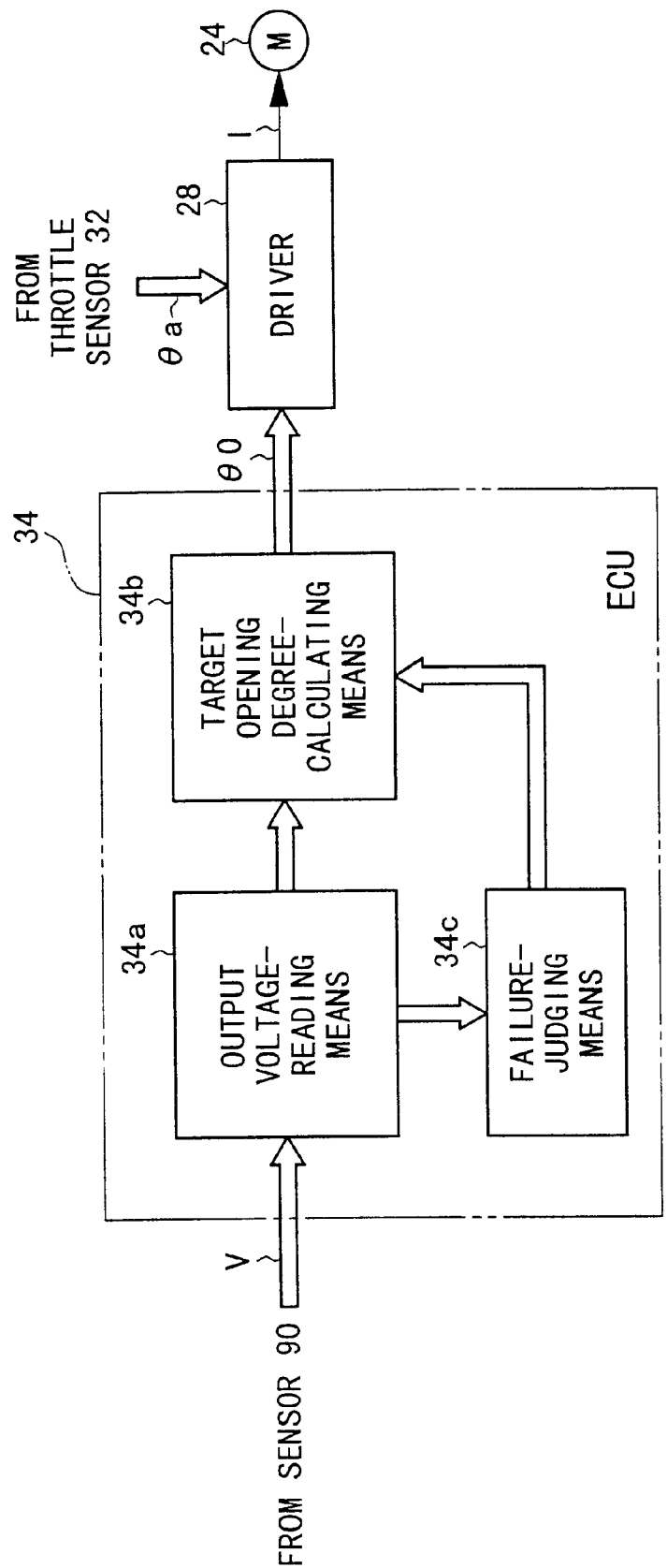
FIG. 7 shows a functional block diagram illustrating the processing operation principally performed by ECU of the automobile shown in FIG. 1.

As shown in a functional block diagram in FIG. 7, at first, ECU 34 incorporates the output voltage V from the sensor 90 with an output voltage-reading means 34a. The output voltage V is outputted from the sensor 90 in accordance with the pedaling amount of the accelerator pedal 42.

Subsequently, a target opening degree-calculating means 34b of ECU 34 determines a request output as an output required for the engine 14, on the basis of the output voltage V supplied from the output voltage-reading means 34a. The target opening degree-calculating means 34b outputs, to the driver 28, the target opening degree $\theta 0$ for the throttle valve 26 corresponding to the request output.

Figure 8:
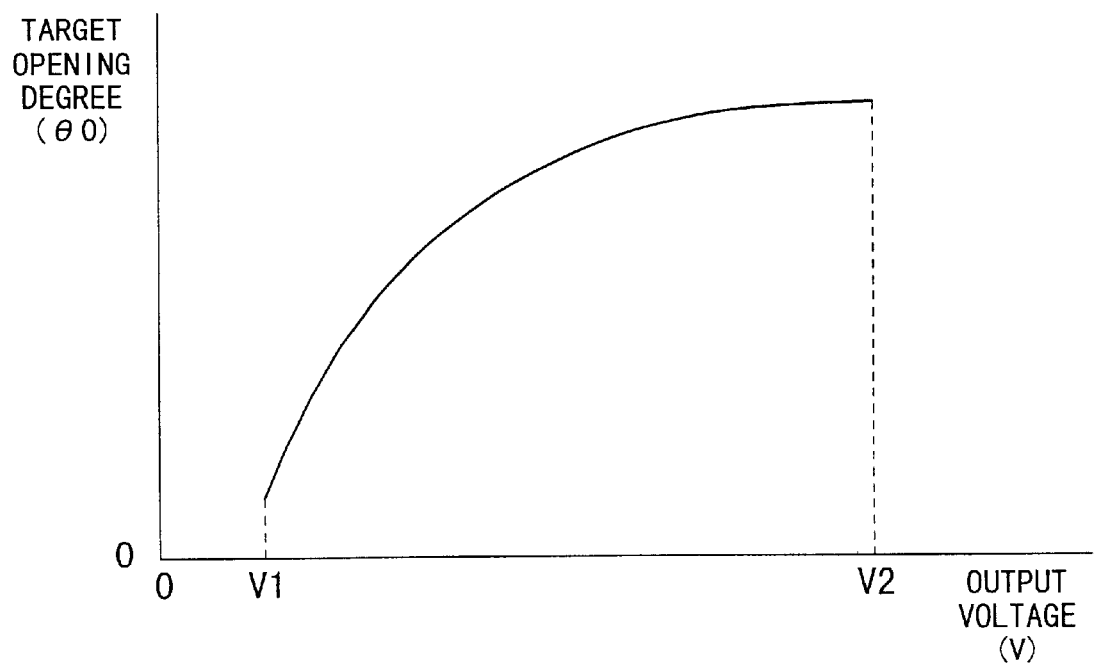
FIG. 8 shows a graph illustrating a characteristic of the target opening degree of a throttle valve with respect to the output voltage.

In this arrangement, the characteristic of the target opening degree $\theta 0$ with respect to the output voltage V, which is determined by ECU 34, is a substantially quadric characteristic as shown in FIG. 8.

A failure-judging means 34c of ECU 34 detects the disorder of the sensor 90 by comparing the output voltage V with a predetermined disorder judgement value (V3). If the failure-judging means 34c judges that the output voltage V satisfies V>V3, and any disorder occurs in the sensor 90, then it supplies the information (disorder information) to the target opening degree-calculating means 34b.

If the disorder information is supplied, the target opening degree-calculating means 34b performs a predetermined process upon the occurrence of disorder. Those performed as the process upon the occurrence of disorder include, for example a process for allowing the target opening degree $\theta 0$ to be an idle opening degree θi (throttle opening degree θa to give an idling state of the engine 14), or a process for allowing the target opening degree θ0 to be a value (θi+α) obtained by adding a predetermined value a to the idle opening degree θi.

The driver 28 determines the value of the motor current I to be supplied to the motor 24, on the basis of the target opening degree θ0 from the target opening degree-calculating means 34b and the throttle opening degree θa from the throttle sensor 32. The motor 24 is driven on the basis of the motor current I from the driver 28, and thus the opening degree of the throttle valve 26 is regulated.

Next, explanation will be made for an accelerator opening degree sensor 120 (simply referred to as "sensor" as well) according to the second embodiment of the present invention. The same constitutive components as those of the accelerator opening degree sensor 90 according to the first embodiment are designated by the same reference numerals, detailed explanation of which will be omitted (accelerator opening degree sensor 140 according to the third embodiment will be described later on in the same manner as described above).

Figure 9:
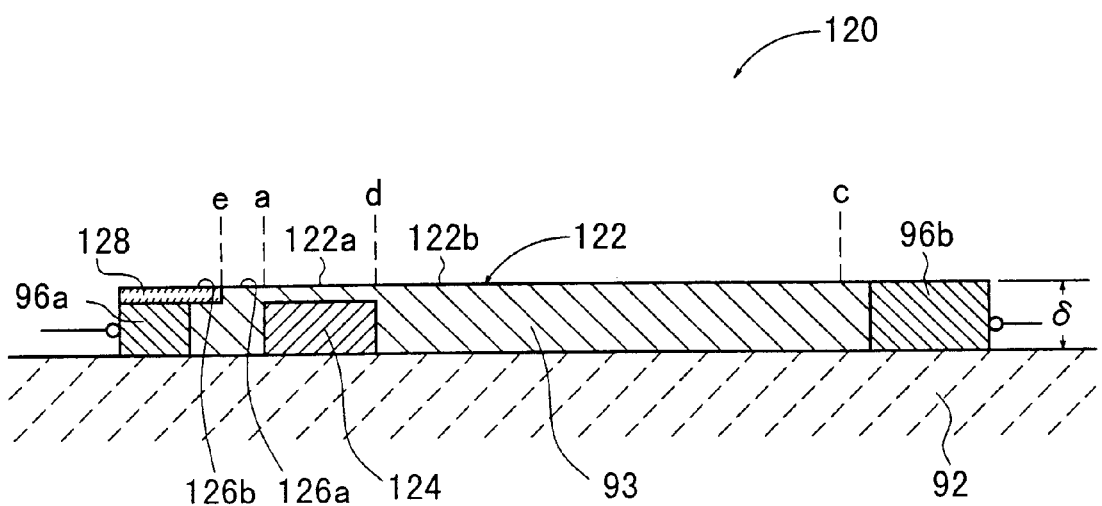
FIG. 9 shows, with partial omission, an accelerator opening degree sensor according to the second embodiment of the present invention.

As shown in FIG. 9, a resistor electrode 122 is formed on a base plate 92 of the sensor 120. The resistor electrode 122 has a stepped section 122a corresponding to a first conversion region (stepped region) ranging from the start point "a" to the transition point "d" (point corresponding to the position in the vicinity of the pedaling start of the accelerator pedal 42 at which the accelerator opening degree θ satisfies θ=θ3). The resistor electrode 122 has a linear section 122b corresponding to a second conversion region (linear region) ranging from the transition point "d" to the end point "c".

The stepped section 122a is formed by laminating one or multiple layers of the resistor 93 composed of a resistance substance on a conductive layer 124 formed on the base plate 92. On the other hand, the linear section 122b is formed by laminating one or multiple layers of the resistor 93 on the base plate 92.

The thickness δ of the resistor electrode 122 including the conductive layer 124 is constant in the effective movable range of the pedal. In other words, the resistor electrode 122 is formed such that the stepped section 122a is thin as compared with the linear section 122b.

The region of the resistor electrode 122, which is disposed between the start point "a" and the negative side end point "e" (point at which the accelerator opening degree θ satisfies θ=−θ4, and which is disposed on the opposite side (negative side) in the pedaling direction of the accelerator pedal 42 with respect to the start point "a"), is constructed as a pedal allowance range.

A negative side linear section 126a, which constitutes a negative side linear region as a variable region, is formed at a portion of the resistor electrode 122 corresponding to the pedal allowance range. A zero value section 126b, which constitutes a zero value region as an invariable region, is formed on the further negative side of the negative side linear section 126a. The position, at which the stopper for regulating the movable range of the brush 102 on the negative side is provided, is located in the zero value region.

The negative side linear section 126a is formed by laminating one or multiple layers of the resistor 93 composed of the resistance substance on the base plate 92. On the other hand, the zero value section 126b is constructed to include an insulator 128 which is laminated to ride over the connecting electrode 96a from the resistor 93 laminated in one or multiple layers on the base plate 92. The upper surface of the insulator 128 is formed to be continuous to the upper surface of the resistor electrode 94, for example, at the negative side linear section 126a so that the brush 102 is slidable thereon.

Figure 10:
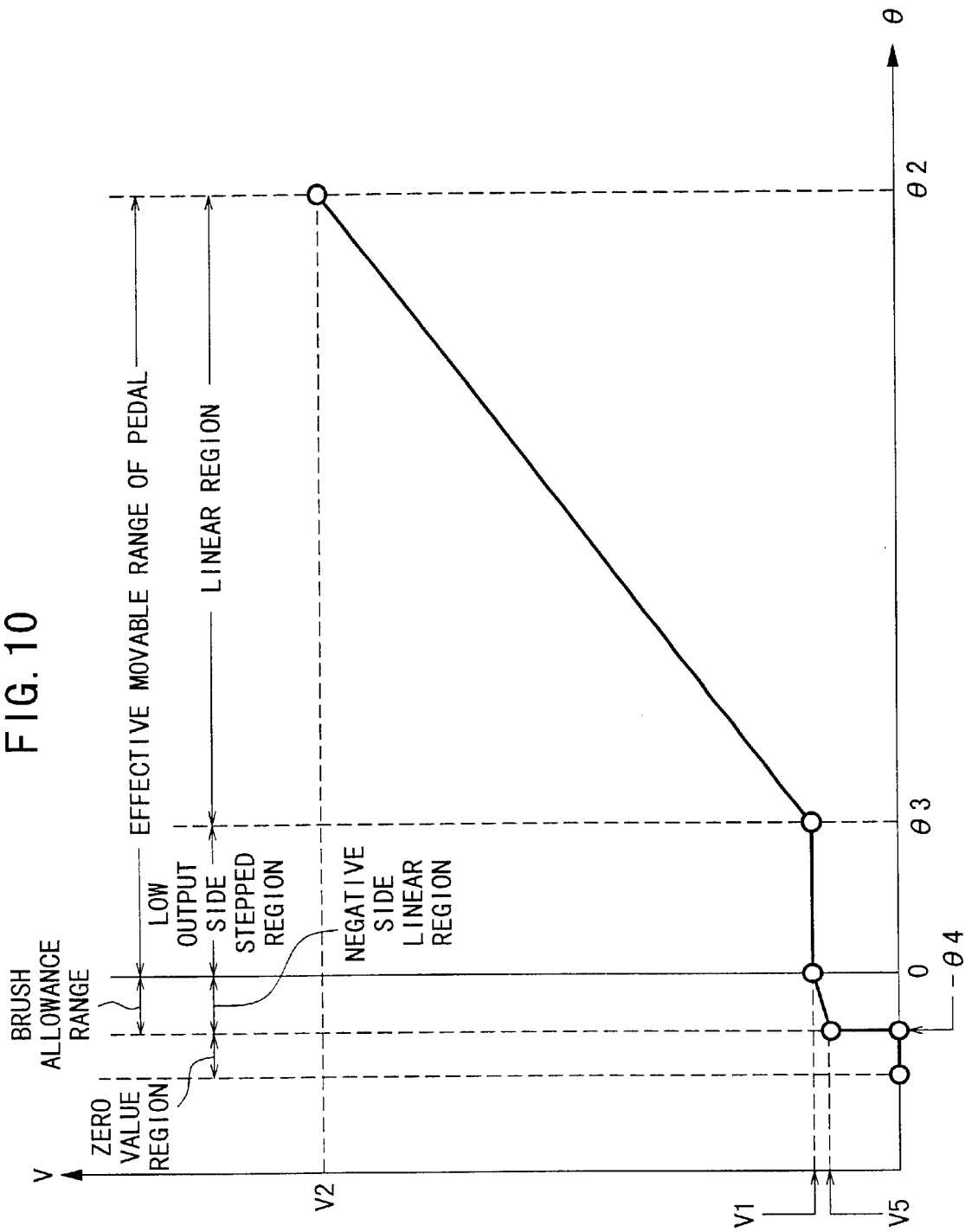
FIG. 10 shows a graph illustrating a characteristic of the output voltage with respect to the accelerator opening degree concerning the accelerator opening degree sensor shown in FIG. 9.

FIG. 10 shows a characteristic of the output voltage V outputted from the sensor 120 on the basis of the accelerator opening degree θ.

The output voltage V in the stepped region has a constant value of V=V1 with respect to the change of the accelerator opening degree θ. In other words, the stepped region is an invariable region in which the output voltage V is not changed.

Figure 11:
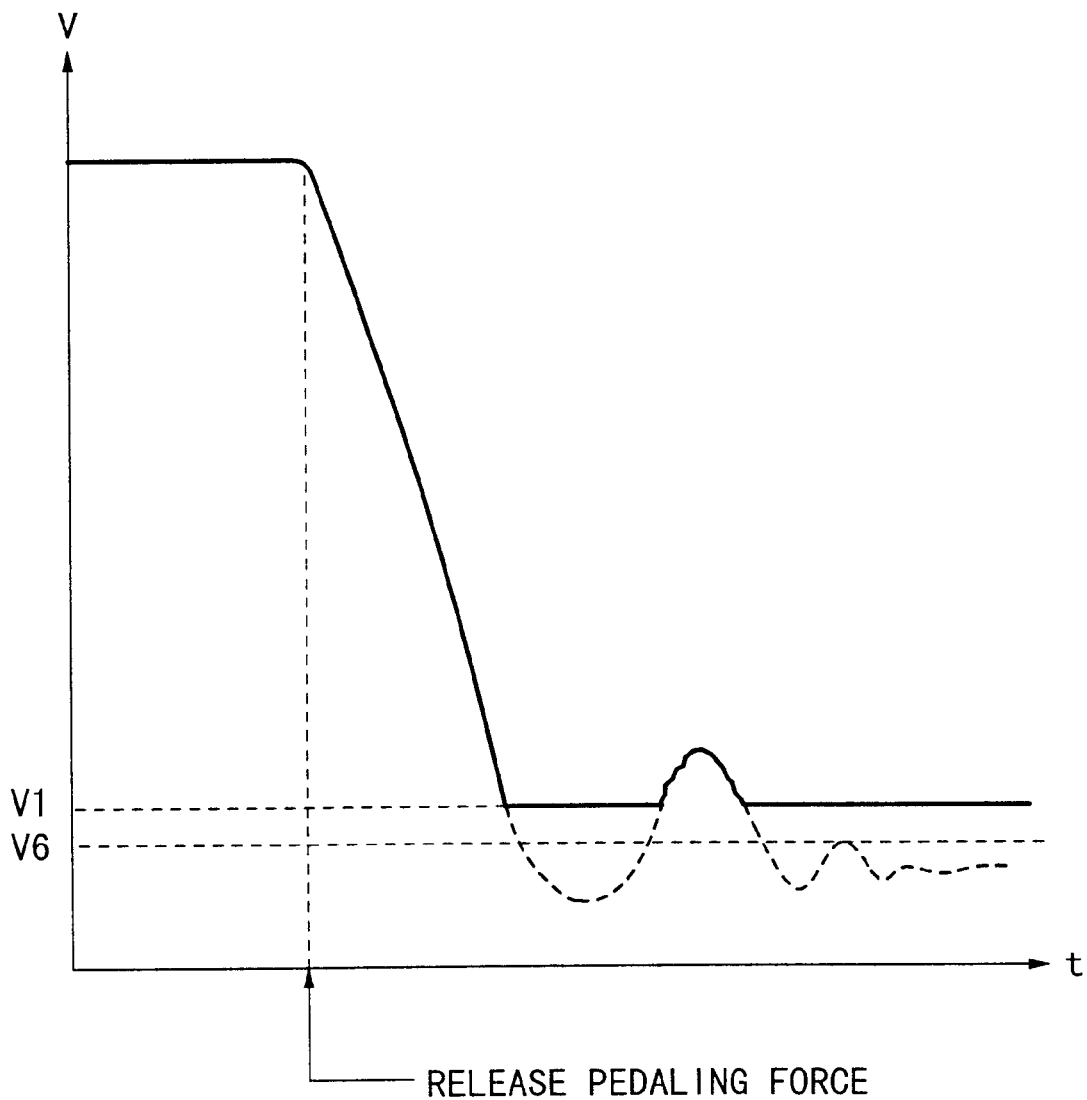
FIG. 11 shows a graph illustrating a characteristic of the output voltage with respect to the time concerning the accelerator opening degree sensor shown in FIG. 9.

When the invariable region is provided as described above, as shown in a characteristic curve of t (time)-V (output voltage) in FIG. 11, the fluctuation of the output voltage V (depicted by a broken line in FIG. 11) is suppressed on the side in which the value of the output voltage V is lower than V=V1. Specifically, for example, even when the driver instantaneously releases the pedaling force having been exerted on the pedal lever 44, and the damping generated on the pedal lever 44 during this process is transmitted to the brush 102, then the fluctuation of the output voltage V is suppressed. Further, the output voltage V is prevented from being lower than a predetermined limit value V6 as well.

The output voltage V in the linear region is increased linearly (proportionally) from V=V1 to V=V2 in accordance with the increase in the accelerator opening degree θ from θ=θ3 to θ=θ2. That is, the linear region is a variable region in which the output voltage V is changed depending on the accelerator opening degree θ.

The output voltage V in the negative side linear region is decreased linearly (proportionally) from V=V1 to V=V5 in accordance with the decrease in the accelerator opening degree θ from θ=0 to θ=−θ4. The output voltage V in the zero value region has the constant value of V=0 with respect to the change in the accelerator opening degree θ.

In this arrangement, when the failure-judging means 34c shown in FIG. 7 is used to detect a state in which the output voltage V satisfies V=0, for example, it is possible to detect a state in which the connection between the sensor unit 84 and the accelerator unit 40 (connection between the rod 103 and the projection 79) is unstable.

Next, explanation will be made for an accelerator opening degree sensor 140 (simply referred to as "sensor" as well) according to the third embodiment of the present invention.

Figure 12:
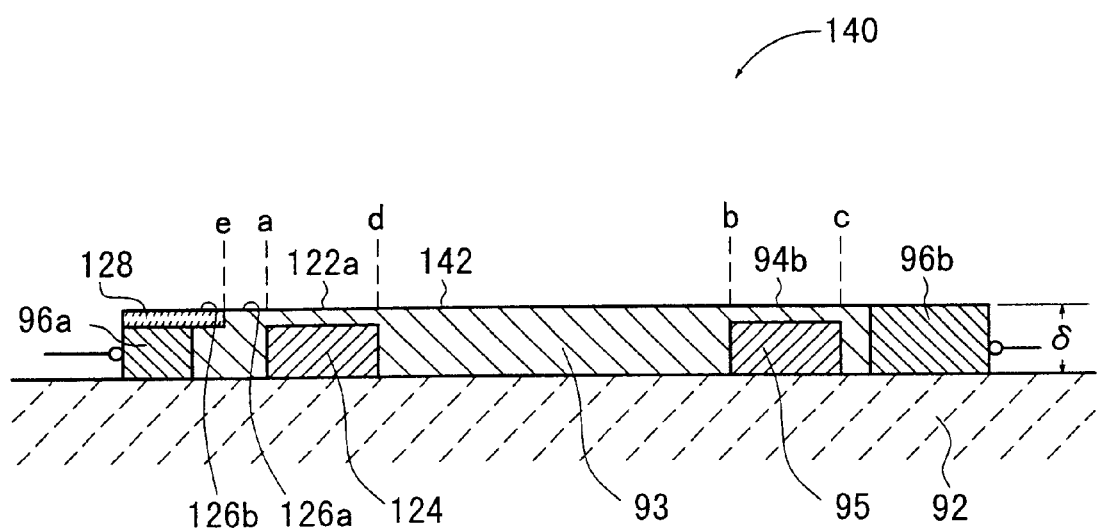
FIG. 12 shows, with partial omission, an accelerator opening degree sensor according to the third embodiment of the present invention.

As shown in FIG. 12, the sensor 140 comprises the same stepped section 94b as that of the sensor 90 according to the first embodiment shown in FIG. 5, the same stepped section 122a as that of the sensor 120 according to the second embodiment shown in FIG. 9, and a linear section 142 formed between the stepped section 94b and the stepped section 122a. In the following description, the stepped section 94b is referred to as "high output side stepped section 94b", and the region corresponding thereto is referred to as "high output side stepped region". The stepped section 122a is referred to as "low output side stepped section 122a", and the region corresponding thereto is referred to as "low output side stepped region".

The linear section 142 is formed by laminating one layer or multiple layers of the resistor 93 composed of the resistance substance on the base plate 92, in the same manner as the linear section 94a shown in FIG. 5 and the linear section 122b shown in FIG. 9. The region corresponding to the linear section 142 is referred to as "linear region".

The sensor 140 shown in FIG. 12 is provided with the same negative side linear section 126a and the same zero value section 126b as those of the sensor 120 shown in FIG. 9.

Figure 13:
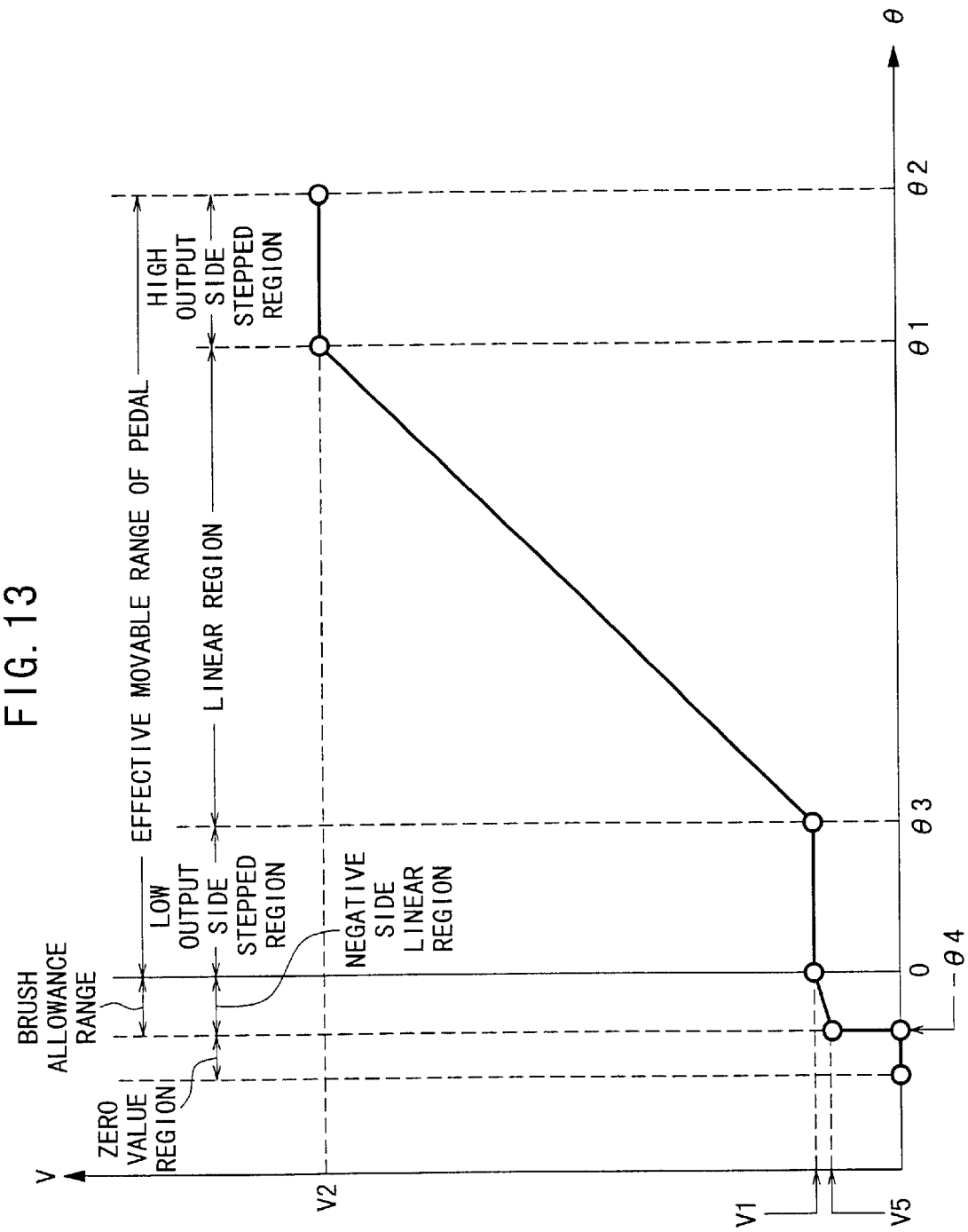
FIG. 13 shows a graph illustrating a characteristic of the output voltage with respect to the accelerator opening degree concerning the accelerator opening degree sensor shown in FIG. 12.

FIG. 13 shows a characteristic of the output voltage V outputted from the sensor 140 on the basis of the accelerator opening degree θ.

The output voltage V in the linear region is increased linearly (proportionally) from V=V1 to V=V2 in accordance with the increase in the accelerator opening degree θ from θ=θ3 to θ=θ1.

The characteristics of the output voltage V in the other regions (high output side stepped region, low output side stepped region, negative side linear region, and zero value region) are the same as the characteristic of the stepped region shown in FIG. 6 and the characteristics of the stepped region, the negative side linear region, and the zero value region shown in FIG. 10 respectively.

As explained above, according to the present invention, the accelerator opening degree sensor comprises a pedaling amount/voltage conversion means for changing a ratio of change of the output voltage with respect to the pedaling amount of an accelerator pedal; wherein the pedaling amount/voltage conversion means includes a variable region constructed to increase the output voltage in accordance with increase in the pedaling amount; and an invariable region constructed to give a substantially constant value of the output voltage with respect to change of the pedaling amount.

In this arrangement, the variable region includes a region from a pedaling start position of the accelerator pedal to a position in the vicinity of end of pedaling; and the invariable region includes a region from the position in the vicinity of the end of the pedaling of the accelerator pedal to a pedaling end position.

In this arrangement, the output voltage is prevented from exceeding the predetermined limit value or the disorder judgement value in the vicinity of the pedaling end position. Further, it is possible to obtain the sufficient output voltage in the pedaling range of the accelerator pedal.

The variable region includes a region from a position in the vicinity of start of pedaling of the accelerator pedal to a pedaling end position; and the invariable region includes a region from the pedaling start position of the accelerator pedal to a position in the vicinity of the start of the pedaling.

In this arrangement, the fluctuation of the output voltage is suppressed in the vicinity of the pedaling start position. Further, it is possible to obtain the sufficient output voltage in the pedaling range of the accelerator pedal.

The variable region includes a region from a position in the vicinity of start of pedaling of the accelerator pedal to a position in the vicinity of end of the pedaling; and the invariable region includes a region from a pedaling start position of the accelerator pedal to the position in the vicinity of the start of the pedaling, and a region from the position in the vicinity of the end of the pedaling of the accelerator pedal to a pedaling end position.

In this arrangement, the output voltage is prevented from exceeding the predetermined limit value or the disorder judgement value in the vicinity of the pedaling end position. Further, the fluctuation of the output voltage is suppressed in the vicinity of the pedaling start position. Furthermore, it is possible to obtain the sufficient output voltage in the pedaling range of the accelerator pedal.

The pedaling amount/voltage conversion means includes a zero value region which is disposed on an opposite side in a pedaling direction with respect to the pedaling start position of the accelerator pedal and which is constructed to give a constant value of substantially zero of the output voltage with respect to the change of the pedaling amount.

In this arrangement, it is possible to detect a state in which the pedaling amount/voltage conversion means is unstably connected to the accelerator pedal by detecting the state in which the output voltage is substantially zero.

The pedaling amount/voltage conversion means is a potentiometer comprising a resistor arranged between fixed side terminals with a sliding element for making sliding movement on the resistor, the sliding element being connected to a movable side terminal; the variable region has a structure composed of only the resistor; and the invariable region has a structure composed of a conductor laminated on the resistor. Accordingly, it is easy to form the variable region and the invariable region.

The pedaling amount/voltage conversion means is a potentiometer comprising a resistor arranged between fixed side terminals with a sliding element for making sliding movement on the resistor, the sliding element being connected to a movable side terminal; the variable region has a structure composed of only the resistor; the invariable region has a structure composed of a conductor laminated on the resistor; and the zero value region includes an insulator arranged to be continuous to a portion on the resistor on which the sliding element slides. Accordingly, it is easy to form the variable region, the invariable region, and the zero value region.

The potentiometer has a rotary shaft which is integrally attached to a support shaft of a lever provided with the accelerator pedal at one end. Accordingly, it is possible to realize a light weight and a low price of the accelerator opening degree sensor.

What is claimed is:

1. An accelerator opening degree sensor for detecting a pedaling amount of an accelerator pedal as an output voltage, comprising:
    an accelerator pedal;
    a pedaling amount/voltage conversion means for changing a ratio of change of said output voltage with respect to said pedaling amount, wherein said pedaling amount/voltage conversion means includes:
      a variable region comprising said resistive layer and constructed to increase said output voltage in accordance with increase in said pedaling amount;
      an invariable region comprising said resistive layer and a conductive layer embedded in said resistive layer and constructed to give a substantially constant value of said output voltage with respect to change of said pedaling amount; and
      a sliding element connected to said accelerator pedal and making sliding contact, corresponding to said pedaling amount, on a resistor material layer spanning said variable region and said invariable region;
      wherein said variable region includes a region from a position in a vicinity of start of pedaling of an accelerator pedal to a pedaling end position;
      wherein said invariable region includes a region from a pedaling start position of an accelerator pedal to a position in the vicinity of said start of pedaling, and further comprises a stepped region constructed such that the output voltage with respect to a change in pedaling amount is a predetermined value larger than a zero value.

2. The accelerator opening degree sensor according to claim 1, wherein:
    said pedaling amount/voltage conversion means includes a zero value region which is disposed on an opposite side in a pedaling direction with respect to said pedaling start position of said accelerator pedal and which is constructed to give a constant value of substantially zero of said output voltage with respect to said change of said pedaling amount.

3. The accelerator opening degree sensor according to claim 1, wherein:

said pedaling amount/voltage conversion means is a potentiometer comprising a resistor arranged between fixed side terminals with a sliding element for making sliding movement on said resistor, said sliding element being connected to a movable side terminal;

said variable region has a structure composed of only said resistor; and said invariable region has a structure composed of a conductor laminated on said resistor.

4. The accelerator opening degree sensor according to claim 2, wherein:

said pedaling amount/voltage conversion means is a potentiometer comprising a resistor arranged between fixed side terminals with a sliding element for making sliding movement on said resistor, said sliding element being connected to a movable side terminal;

said variable region has a structure composed of only said resistor;

said invariable region has a structure composed of a conductor laminated on said resistor; and said zero value region includes an insulator arranged to be continuous to a portion on said resistor on which said sliding element slides.

5. The accelerator opening degree sensor according to claim 3, wherein said potentiometer has a rotary shaft which is integrally attached to a support shaft of a lever provided with an accelerator pedal at one end.

6. The accelerator opening degree sensor according to claim 1, and further comprising:

electrical contact members comprising conductors disposed at respective ends of said resistive layer, wherein said sliding element has an effective movable range within said variable region and said invariable region without coming into direct contact with said electrical contact member.

7. The accelerator opening degree sensor according to claim 6, wherein at least one of said electrical contact members is covered by an insulative layer.

* * * * *